United States Patent
Ota et al.

(10) Patent No.: US 12,427,833 B2
(45) Date of Patent: Sep. 30, 2025

(54) METHOD AND SYSTEM FOR OPERATING IN-VEHICLE AIR CONDITIONER

(71) Applicant: TOYOTA JIDOSHA KABUSHIKI KAISHA, Toyota (JP)

(72) Inventors: Shun Ota, Susono (JP); Taro Hasegawa, Toyota (JP); Tomoya Takeda, Toyota (JP); Yuka Nishiyama, Toyota (JP); Hiroya Chiba, Fuji (JP); Tatsuya Sugano, Sunto-gun (JP); Taizo Masuda, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 318 days.

(21) Appl. No.: 18/187,234

(22) Filed: Mar. 21, 2023

(65) Prior Publication Data

US 2023/0415545 A1    Dec. 28, 2023

(30) Foreign Application Priority Data

Jun. 24, 2022 (JP) .................... 2022-102166

(51) Int. Cl.
*B60H 1/00* (2006.01)

(52) U.S. Cl.
CPC ..... *B60H 1/00985* (2013.01); *B60H 1/00657* (2013.01); *B60H 1/00735* (2013.01)

(58) Field of Classification Search
CPC ............ B60H 1/00985; B60H 1/00657; B60H 1/00735; B60H 1/00778; B60H 1/00642; B60H 1/00; H04W 4/20; H04W 4/40; H04W 4/48

USPC .......................................... 701/36
See application file for complete search history.

(56) References Cited

U.S. PATENT DOCUMENTS

| | | | |
|---|---|---|---|
| 2009/0064696 A1* | 3/2009 | Perkins .............. | B60H 1/00428 62/244 |
| 2014/0100716 A1* | 4/2014 | Kawai .................... | B60L 53/14 701/2 |
| 2014/0330453 A1* | 11/2014 | Nakagawa .............. | B60L 53/63 701/2 |
| 2015/0148989 A1* | 5/2015 | Cooper .................. | E05F 15/77 701/2 |
| 2018/0222283 A1* | 8/2018 | Tamane ............. | B60H 1/00742 |

(Continued)

FOREIGN PATENT DOCUMENTS

JP        7-266845 A       10/1995

*Primary Examiner* — Navid Z. Mehdizadeh
*Assistant Examiner* — Brian K Palmarchuk
(74) *Attorney, Agent, or Firm* — Oblon, McClelland, Maier & Neustadt, L.L.P.

(57) ABSTRACT

A method for operating an air conditioner installed in a vehicle is provided. The method includes a step of operating the air conditioner according to an operation instruction for the air conditioner when the operation instruction is received from a mobile terminal of an operator of the vehicle, and a step of displaying a notification related to an operation of the air conditioner on a screen of the mobile terminal while the air conditioner is operated according to the operation instruction, the step being a step in which the notification related to the operation of the air conditioner is continuously displayed on the screen without being deleted by a predetermined operation of the mobile terminal by the operator when the mobile terminal is located outside the vehicle.

10 Claims, 8 Drawing Sheets

(56) References Cited

U.S. PATENT DOCUMENTS

2020/0122549 A1* 4/2020 Seki .................. B60H 1/00807
2020/0307352 A1* 10/2020 Boston ............... B60H 1/00357
2021/0402922 A1* 12/2021 Wincek ................... B60Q 9/00

* cited by examiner

METHOD AND SYSTEM FOR OPERATING IN-VEHICLE AIR CONDITIONER

CROSS-REFERENCE TO RELATED APPLICATION

This application claims priority to Japanese Patent Application No. 2022-102166 filed on Jun. 24, 2022, incorporated herein by reference in its entirety.

BACKGROUND

1. Technical Field

The present disclosure relates to a method and a system for operating an air conditioner of a vehicle from outside the vehicle.

2. Description of Related Art

Japanese Unexamined Patent Application Publication No. 07-266845 (JP 07-266845 A) discloses a television having a function of operating an air conditioner installed in a vehicle.

SUMMARY

A case is considered in which an air conditioner is operated not by a device installed in a vehicle but by a mobile terminal (for example, a smartphone and a tablet) of an operator (for example, a driver) of the vehicle. In this case, the air conditioner can be operated from outside the vehicle by using network communication. Therefore, for example, the air conditioner can be operated before the operator gets into the vehicle, and the air conditioner can be continuously operated while the operator is temporarily away from the vehicle. However, in such a case, there is a risk that the operator outside the vehicle forgets that the air conditioner is in operation, and there is an issue that the remaining capacity of a battery of the vehicle that supplies power to the air conditioner significantly decreases.

One object of the present disclosure is to provide a technique for suppressing a significant decrease in the remaining capacity of the battery of the vehicle that supplies power to the air conditioner in advance when the air conditioner installed in the vehicle is operated from outside the vehicle.

A first aspect of the present disclosure is a method for operating an air conditioner installed in a vehicle, and includes the following features.

The Method Includes:
  a step of operating the air conditioner according to an operation instruction for the air conditioner when the operation instruction is received from a mobile terminal of an operator of the vehicle; and
  a step of displaying a notification related to an operation of the air conditioner on a screen of the mobile terminal while the air conditioner is operated according to the operation instruction, the step being a step in which the notification related to the operation of the air conditioner is continuously displayed on the screen without being deleted by a predetermined operation of the mobile terminal by the operator when the mobile terminal is located outside the vehicle.

A second aspect of the present disclosure is a system for operating an air conditioner installed in a vehicle, and includes the following features.

The system includes: a vehicle terminal that controls an operation of the air conditioner; and a mobile terminal of an operator of the vehicle that communicates with the vehicle terminal.

The vehicle terminal operates the air conditioner according to an operation instruction for the air conditioner when the operation instruction is received from the mobile terminal.

The mobile terminal displays a notification related to the operation of the air conditioner on a screen of the mobile terminal while the air conditioner is operated according to the operation instruction.

When the mobile terminal is located outside the vehicle, the notification related to the operation of the air conditioner is continuously displayed on the screen without being deleted by a predetermined operation of the mobile terminal by the operator.

According to the present disclosure, while the air conditioner of the vehicle is operated according to the operation instruction from the mobile terminal of the operator of the vehicle, the notification related to the operation of the air conditioner is displayed on the screen of the mobile terminal. Further, when the mobile terminal is located outside the vehicle, the notification related to the operation of the air conditioner is continuously displayed on the screen without being deleted by the predetermined operation of the mobile terminal by the operator. This keeps reminding the operator outside the vehicle that the air conditioner of the vehicle is in operation, so that it is possible to suppress the significant decrease in the remaining capacity of the battery that supplies power to the air conditioner in advance.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a method and a system for operating an in-vehicle air conditioner according to an embodiment of the present disclosure will be described with reference to the drawings. In each drawing, the same or corresponding portions are denoted by the same reference signs and the description thereof will be simplified or omitted.

1. Overview

1-1. Premise

Figure 1:
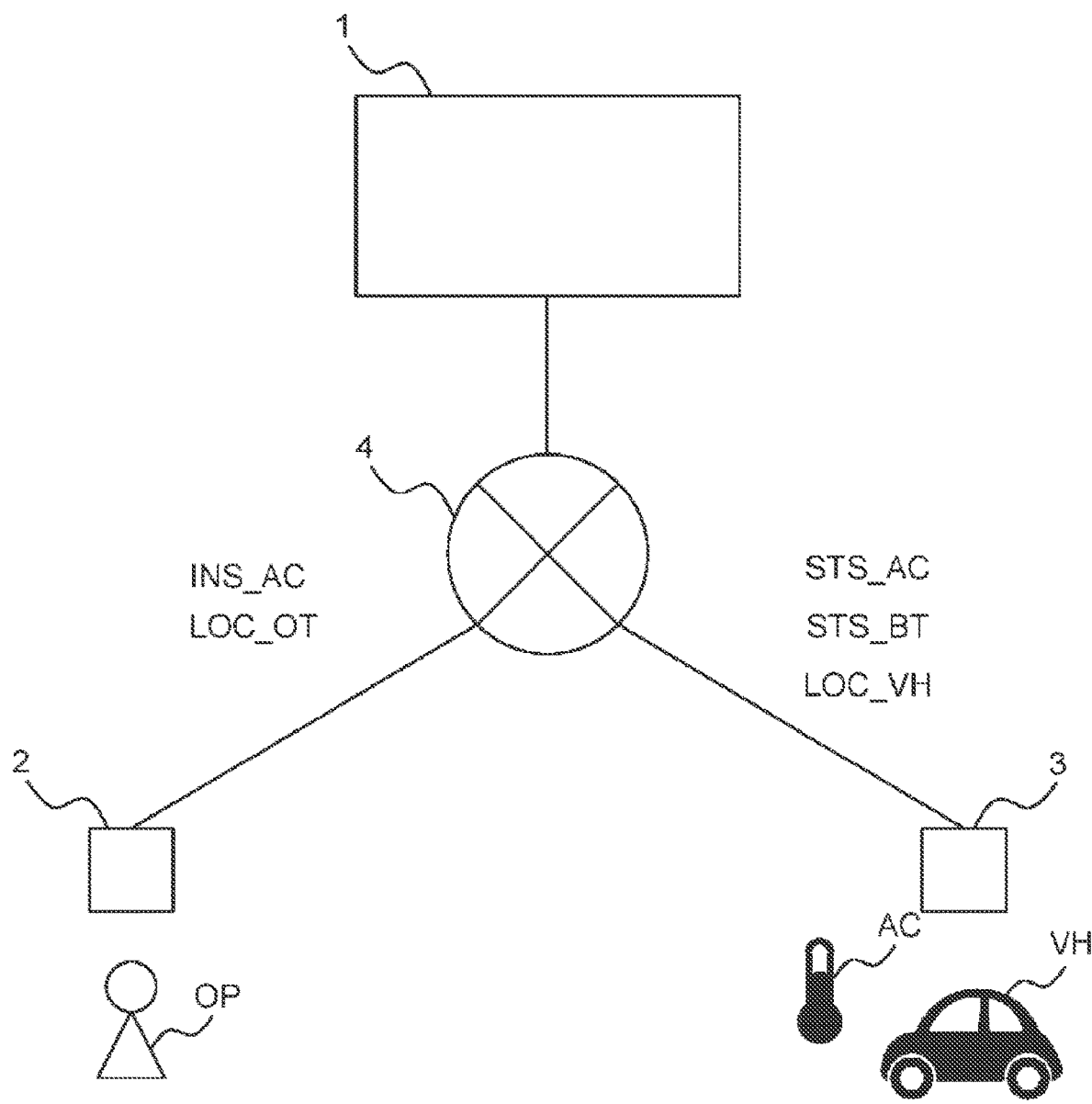
FIG. 1 is a diagram illustrating a premise of an embodiment.

FIG. 1 is a diagram illustrating a premise of the embodiment. In the embodiment, an air conditioner AC of a vehicle VH (for example, an automobile using at least one of an engine and a motor as a drive source) is operated. The operation of the air conditioner AC is performed by an operator OP of the vehicle VH operating a terminal 2 (for example, a smartphone, a tablet, and a wearable device, and hereinafter also referred to as an "OP terminal 2") carried by the operator OP. The operator OP operates the OP terminal 2 to operate the air conditioner AC before the operator OP gets into the vehicle VH, after the operator OP gets off the vehicle VH, or while the operator OP is on the vehicle VH. While the operator OP is on the vehicle VH, the operator OP may operate a device provided in the vehicle VH to operate the air conditioner AC.

FIG. 1 shows an example of data exchanged between the OP terminal 2 and the vehicle VH when the OP terminal 2 is operated to operate the air conditioner AC. An operation instruction INS_AC transmitted from the OP terminal 2 is an instruction for starting (ACON) and ending (ACOFF) the operation of the air conditioner AC. The operation instruction INS_AC is transmitted to a management server 1 via a network 4 and transmitted from the management server 1 to the vehicle VH via the network 4. Location data LOC_OT transmitted from the OP terminal 2 is data indicating the current location of the OP terminal 2. The location data LOC_OT is transmitted to the management server 1 via the network 4.

Two kinds of status data STS_AC and STS_BT related to the operation of the air conditioner AC are transmitted to the management server 1 from a terminal 3 of the vehicle VH (for example, an in-vehicle computer such as a control device and a data processing device, and hereinafter also referred to as a "VH terminal 3"). The status data STS_AC is data indicating the operating state of the air conditioner AC. Examples of the data include an indoor temperature of the vehicle VH (for example, a set temperature and an actual temperature) and an elapsed time after receiving the operation instruction INS_AC (that is, a continuous operation time of the air conditioner AC). The status data STS_T is data indicating the state of the battery that supplies power to the air conditioner AC. Examples of the data include the remaining capacity and the temperature of the battery. The location data LOC_VH is also transmitted from the VH terminal 3 to the management server 1 via the network 4. The location data LOC_VH is data indicating the current position of the VH terminal 3 (that is, the vehicle VH).

1-2. Mobile Terminal of Operator OP

Figure 2:
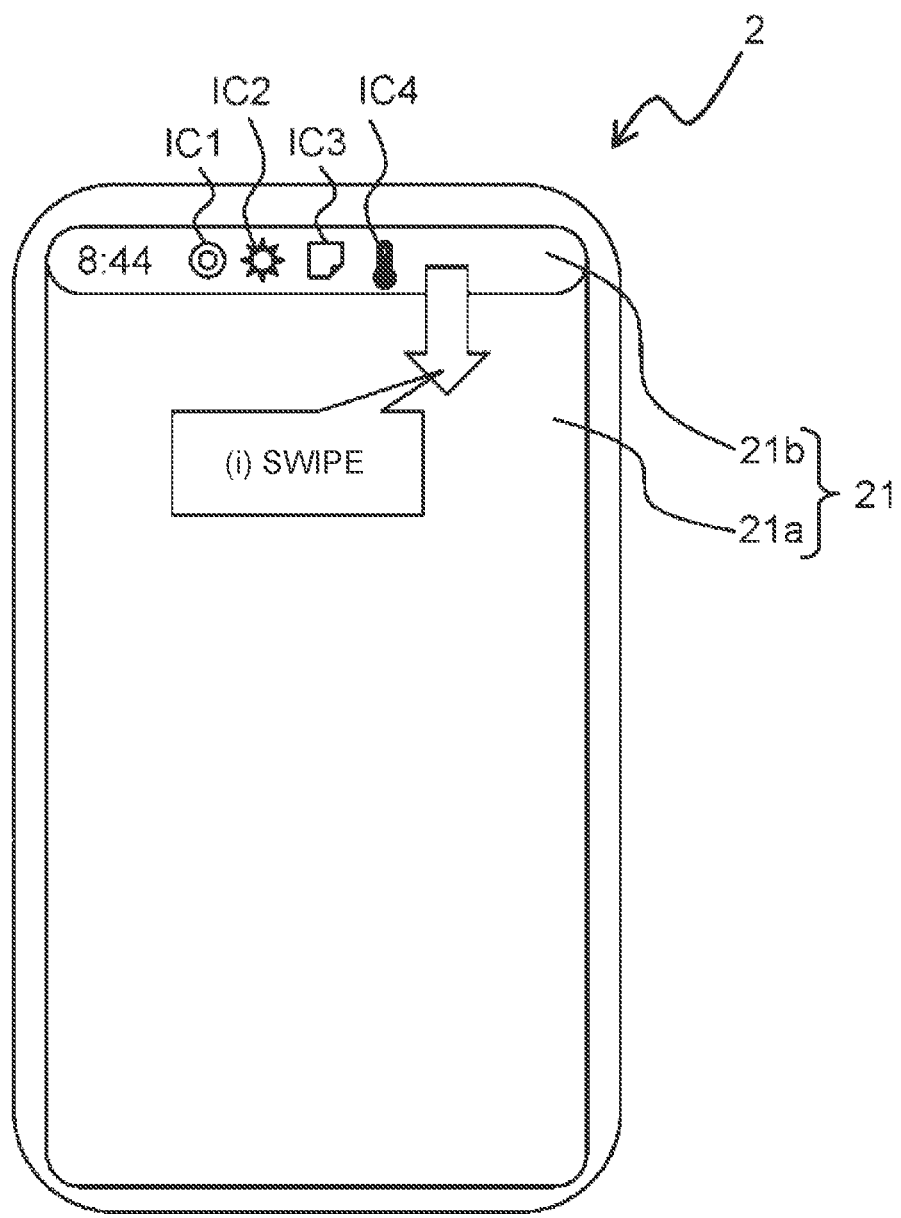
FIG. 2 is a diagram showing an example of a screen of a terminal owned by an operator of a vehicle.

FIG. 2 is a diagram showing an example of a screen of the OP terminal 2.

In the example shown in FIG. 2, a screen 21 of the OP terminal 2 includes a main screen 21a and a status bar 21b. Various contents are displayed on the main screen 21a by a display control process according to various programs executed in the OP terminal 2. The various programs include a program for operating various devices of the vehicle VH including the air conditioner AC (for example, a vehicle key and an audio device). When the vehicle VH has an automatic driving function, the various programs include a program for automatic driving such as automatic starting of a drive source and automatic entry-exit of the vehicle VH. The display control process according to such various programs is performed, so that the operator OP can transmit various instructions to the vehicle VH from outside the vehicle VH via the OP terminal 2.

In the example shown in FIG. 2, the status bar 21b is provided in a part of a screen area above the main screen 21a. When a specific content is displayed on the main screen 21a by execution of the display control process, the status bar 21b may not be displayed on the screen. When the status bar 21b is displayed on the screen, icons corresponding to notifications from the various programs executed by the OP terminal 2 are displayed in the status bar 21b. Icons IC1 to IC4 illustrated in FIG. 2 are examples of the icons corresponding to the notifications from the various programs executed by the OP terminal 2.

Figure 3:
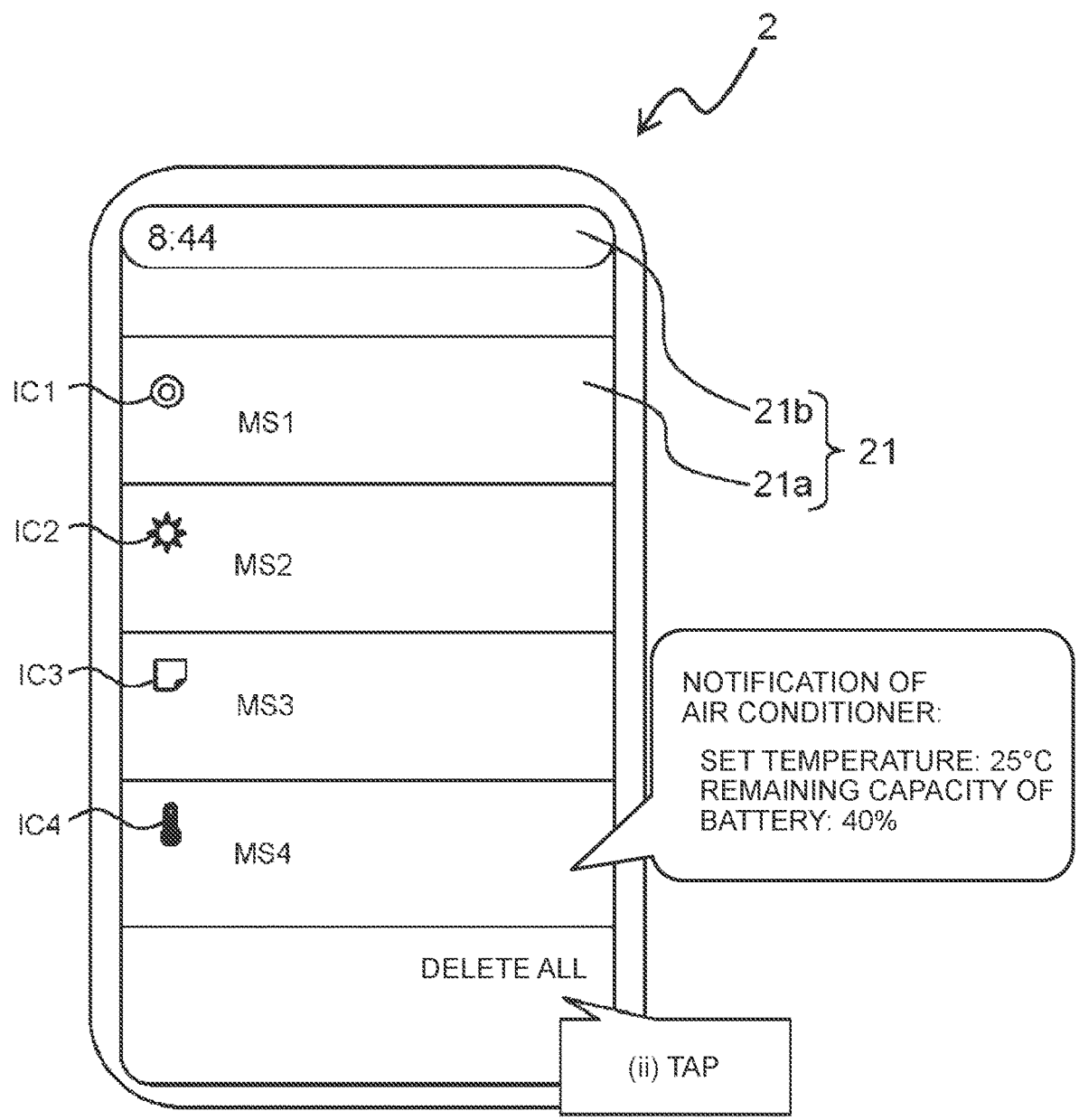
FIG. 3 is a diagram showing an example of a notification drawer displayed on the screen.

The notifications corresponding to the icons IC1 to IC4 illustrated in FIG. 2 can be confirmed by a predetermined operation of the OP terminal 2 by the operator OP. For example, the finger of the operator OP is aligned with the position of the status bar 21b, and the finger is moved downward while maintaining the state of touching the screen (so-called swiping). Then, a list of the notifications (notification drawer) from the various programs is displayed on the screen by the display control process. FIG. 3 is a diagram showing an example of the notification drawer displayed on the screen of the OP terminal 2. Messages MS1 to MS4 shown adjacent to the respective icons IC1 to IC4 are texts indicating notification contents corresponding to the icons IC1 to IC4.

The icon IC4 is an example of an icon corresponding to a notification from a program for operating the air conditioner AC. In the example shown in FIG. 3, the message MS4, which is the notification content from this program, includes the set temperature (25° C.) inside the vehicle VH and the remaining capacity of the battery (40%). The former data is generated based on the status data STS_AC transmitted from the management server 1 to the OP terminal 2. The latter data is generated based on the status data STS_BT transmitted from the management server 1 to the OP terminal 2.

1-2. Feature of Embodiment

By the way, a display control processing program of the OP terminal 2 includes a program for deleting (discarding) the notification displayed in the notification drawer while the notification drawer is displayed. For example, while the notification drawer is displayed on the screen, "Delete All" is displayed below the notification drawer. When a tapping action (so-called tapping) with the finger of the operator OP is detected at the "Delete All" position, all notifications displayed in the notification drawer are deleted by the display control process. Further, in the display control process, when the notification is deleted, the display of the icon displayed in the status bar 21b is also deleted.

Here, in a case where the icon IC4 is deleted by the display control process when the air conditioner AC is in operation, the operator OP may forget that the air conditioner AC is in operation. When the operator OP is outside the vehicle VH, the operator OP who forgets that the air conditioner AC is in operation cannot notice that the remaining capacity of the battery that supplies power to the air conditioner AC decreases. In this case, the operator OP cannot notice that the operation of the air conditioner AC is affected by the significant decrease in the remaining capacity of the battery. When the battery is shared by the drive source of the vehicle VH and the air conditioner AC, the operator OP cannot notice that the cruising distance of the vehicle VH is affected.

In view of such an issue, in the embodiment, the display control process is performed in which when the operator OP is outside the vehicle VH, the icon displayed when the air conditioner AC is operated (that is, the icon IC4) is continuously displayed in the status bar 21b. By performing this process, when the operator OP performs a predetermined operation on the OP terminal 2, the notification corresponding to the icon IC4 is continuously displayed in the notification drawer. It can be determined that the operator OP is outside the vehicle VH, for example, based on the location data LOC_OT and LOC_VH.

Examples of the process for continuously displaying the icon IC4 in the status bar 21b include a process for keeping the display of the icon IC4 in the status bar 21b even when the operator OP performs the predetermined operation described in FIGS. 2 and 3 (for example, tapping "Delete All" after swiping). Examples of the process for keeping the display of the icon IC4 in the status bar 21b include a process for rejecting a delete instruction based on the predetermined operation by the operator OP described in FIGS. 2 and 3, and a process of invalidating the input of this delete instruction.

Figure 4:
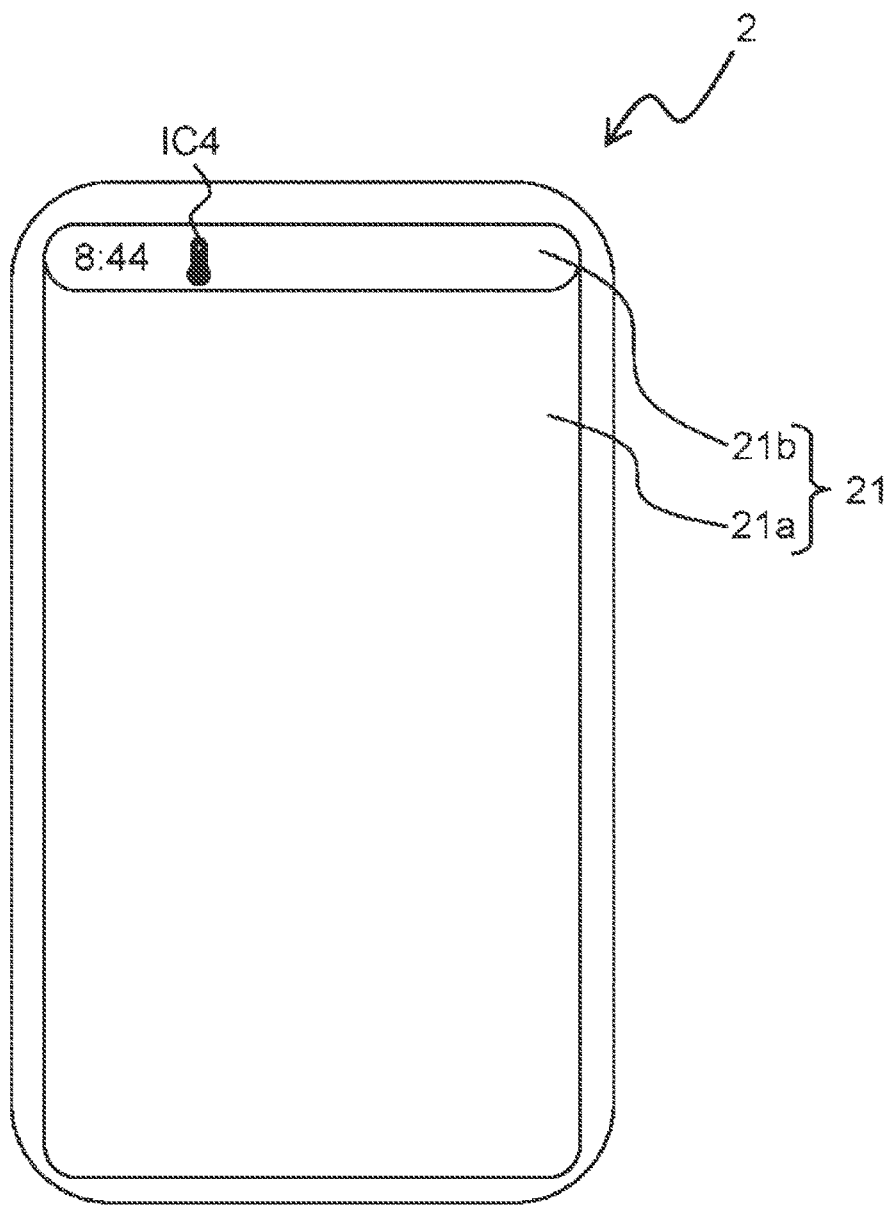
FIG. 4 is a diagram showing an example of the screen when a process for continuously displaying an icon displayed when an air conditioner is operated in a status bar is performed.

FIG. 4 is a diagram showing an example of the screen of the OP terminal 2 when the process for continuously displaying the icon IC4 in the status bar 21b is performed. The example shown in FIG. 4 corresponds to the screen of the OP terminal 2 after the operator OP performs the predetermined operation described in FIGS. 2 and 3. In the example shown in FIG. 4, the icons IC1 to IC3 illustrated in FIG. 2 are removed from the status bar 21b, and only the icon IC4 is displayed here.

As described above, in the embodiment, the process for continuously displaying the icon displayed when the air conditioner AC is operated in the status bar 21b is performed. This keeps reminding the operator OP outside the vehicle VH that the air conditioner AC is in operation, so that it is possible to suppress the significant decrease in the remaining capacity of the battery that supplies power to the air conditioner AC in advance.

2. System Configuration Example

Figure 5:
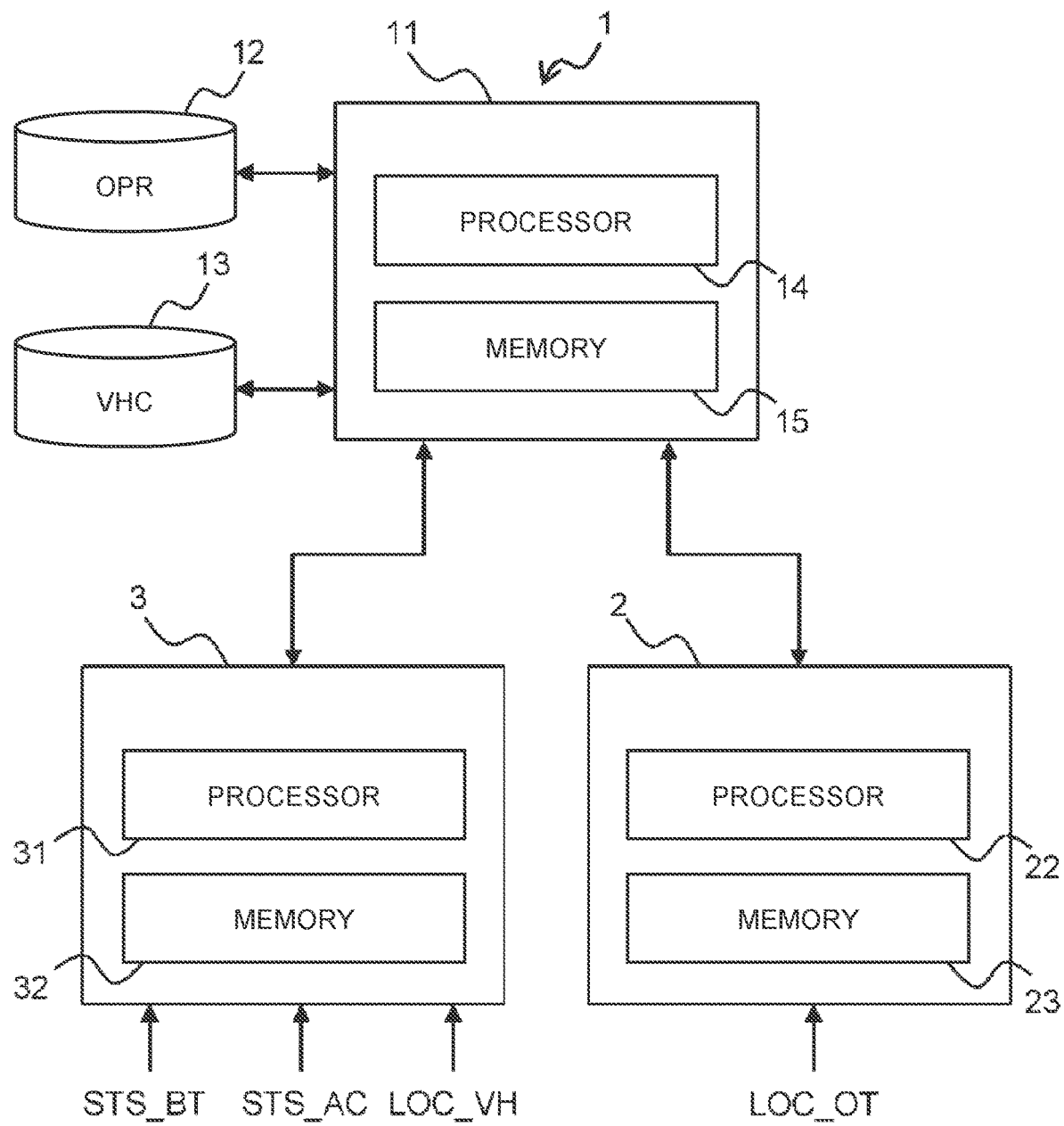
FIG. 5 is a diagram illustrating a configuration example of an operation system according to the embodiment.

FIG. 5 is a diagram illustrating a configuration example of an operation system according to the embodiment. The configuration example shown in FIG. 5 includes the management server 1, the OP terminal 2, and the VH terminal 3. The management server 1 communicates with the OP terminal 2 and the VH terminal 3 via the network 4 shown in FIG. 1. Further, the OP terminal 2 and the VH terminal 3 can perform short-range communication without going through the network 4.

In the example shown in FIG. 5, the management server 1 includes a data processing device 11, an operator database (DB) 12, and a vehicle DB 13. These databases and the data processing device 11 are connected by a predetermined network.

The data processing device 11 includes at least one processor 14 and at least one memory 15. The processor 14 includes a central processing unit (CPU). The memory 15 is a volatile memory such as a double data rate (DDR) memory, and expands the various programs used by the processor 14 and temporarily stores various data. The various data used by the processor 14 include data stored in a database such as the operator DB 12.

The operator DB 12 stores data of the operator OP (hereinafter also referred to as "operator data OPR"). Examples of the operator data OPR include identification data. The identification data is data for identifying the operator OP. The identification data is registered by the operator OP when the vehicle VH is registered in the vehicle DB 13, for example. Examples of the identification data include general data such as a name, age, gender, address, and contact information of the operator OP. The identification data also includes identification data of the terminal 2 carried by the operator OP (that is, the OP terminal 2) and the location data LOC_OT of this terminal 2. The identification data may include identification data of the vehicle VH operated by the operator OP (for example, a vehicle registration number, a vehicle body identification number).

The vehicle DB 13 stores data of the vehicle VH (hereinafter also referred to as "vehicle data VHC"). Examples of the vehicle data VHS include the identification data. The identification data is data for identifying the vehicle VH. Examples of the identification data include general data such as the vehicle registration number and the vehicle body identification number. The vehicle data VHC includes the status data STS_AC and STS_BT related to the operation of the air conditioner AC of the vehicle VH, and the location data LOC_VH.

The vehicle data VHC may include setting data of a current operation mode of the air conditioner AC of the vehicle VH. This operation mode is a mode in which operating conditions of the air conditioner AC while the operator OP is temporarily away from the vehicle VH is determined, and includes a normal mode and a protection mode. The protection mode is a mode in which priority is given to protection of the physical conditions of other passengers (for example, family and pets of the operator OP) waiting for the operator OP to return inside the vehicle VH while the operator OP is temporarily away from the vehicle VH.

The OP terminal 2 includes at least one processor 22 and at least one memory 23. The processor 22 includes a CPU. The memory 23 is a volatile memory such as a DDR memory, and expands the various programs used by the processor 22 and temporarily stores various data. The various programs include a program for operating various devices of the vehicle VH including the air conditioner AC, a display control processing program, and the like. The various data used by the processor 22 include icon data corresponding to the various programs. The various data may include warning data regarding the remaining capacity of the battery (described below), schedule data of the operator OP (described below), and the like.

The VH terminal 3 includes at least one processor 31 and at least one memory 32. The processor 31 includes a CPU. The memory 32 is a volatile memory such as a DDR memory, and expands the various programs used by the processor 31 and temporarily stores various data. The various programs include a program for operating various devices of the vehicle VH according to various operation instructions received from the management server 1. The various operation instructions include the above-described operation instruction INS_AC. When the vehicle VH has an automatic driving function, the various programs include a program for automatic driving such as automatic starting of a drive source and automatic entry-exit of the vehicle VH.

3. Data Processing Example

Figure 6:
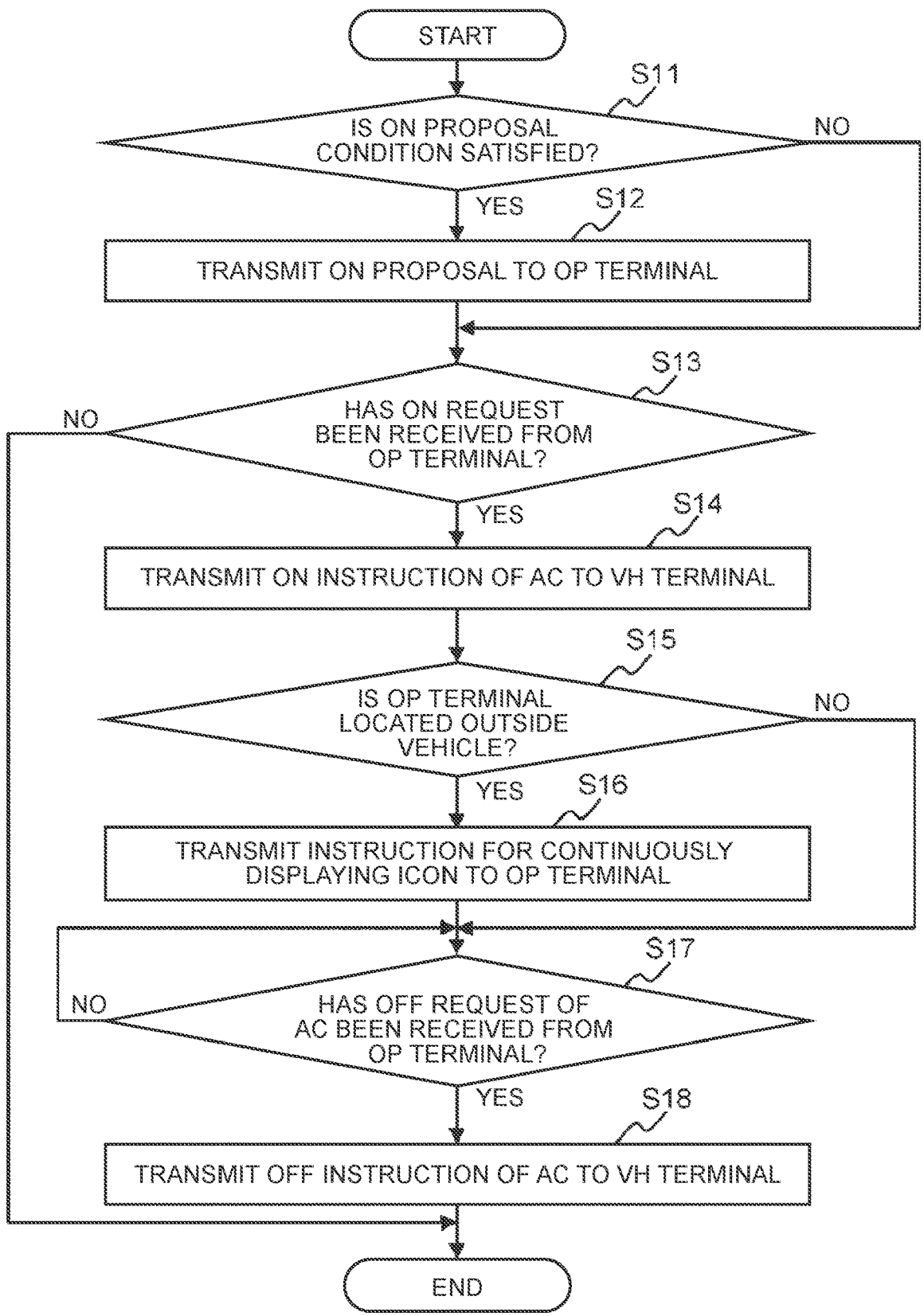
FIG. 6 is a flowchart showing a flow of a process particularly related to the embodiment among processes by a management server.
Figure 7:
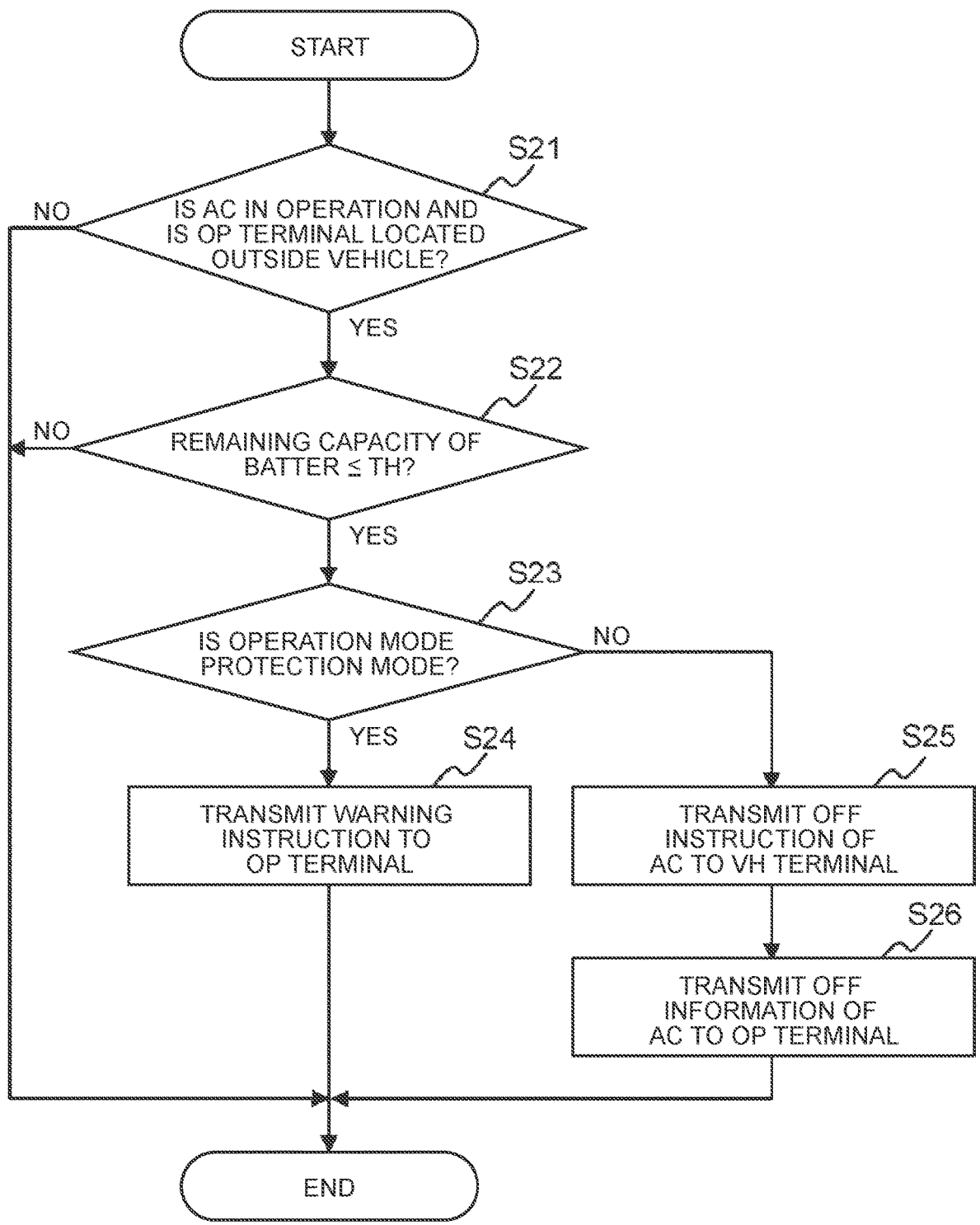
FIG. 7 is a flowchart showing a flow of a process particularly related to the embodiment among the processes by the management server.

FIGS. 6 and 7 are each a flowchart showing a flow of a process particularly related to the embodiment among the processes by the management server 1 (processor 14). The flowcharts shown in FIGS. 6 and 7 are repeatedly executed, for example, at predetermined control cycles.

In the routine shown in FIG. 6, first, it is determined whether a condition for proposing start of the operation of the air conditioner AC (hereinafter also referred to as an "ON proposal condition") is satisfied (step S11). Examples of the ON proposal condition include that the OP terminal 2 is outside the vehicle VH and that the indoor temperature of the vehicle VH (actual temperature) exceeds an upper limit value (for example, 28° C.). Whether the OP terminal 2 is outside the vehicle VH is determined based on, for example, the location data LOC_OT and LOC_VH.

A second example of the ON proposal condition includes that the OP terminal 2 is outside the vehicle VH and that the indoor temperature is below a lower limit value (for example, 15° C.). A third example includes that the OP terminal 2 is outside the vehicle VH and that a difference between the indoor temperature (actual temperature) and an outdoor temperature is equal to or greater than a threshold value. A fourth example includes that the OP terminal 2 is outside the vehicle VH and that the scheduled time for the operator OP to go out is approaching. The scheduled time is grasped based on the schedule data of the operator OP received from the OP terminal 2, for example. The scheduled time of the fourth example may be combined with the first to third examples.

When the determination result in step S11 is affirmative, a proposal to start the operation of the air conditioner AC (hereinafter also referred to as an "ON proposal") is transmitted to the OP terminal 2 (step S12). When the determination result in step S11 is negative, the process proceeds to step S13.

In the process of step S13, it is determined whether a request to start the operation of the air conditioner AC (hereinafter also referred to as an "ON request") has been received from the OP terminal 2. The transmission of the ON request from the OP terminal 2 is performed in response to the ON proposal, or is performed independently of the ON proposal. When the determination result in step S13 is affirmative, an instruction to start the operation of the air conditioner AC (hereinafter also referred to as an "ON instruction") is transmitted to the VH terminal 3 (step S14). In the embodiment, the operation instruction INS_AC including this ON instruction is transmitted to the VH terminal 3, and the VH terminal 3 starts the operation of the air conditioner AC.

Following the process of step S14, it is determined whether the OP terminal 2 is outside the vehicle VH (step S15). Whether the OP terminal 2 is outside the vehicle VH is determined based on, for example, the location data LOC_OT and LOC_VH. When the determination result in step S15 is affirmative, an instruction for continuously displaying the icon of the air conditioner AC is transmitted to the OP terminal 2 (step S16). In the embodiment, the display control process according to this instruction is performed by the OP terminal 2, so that the icon displayed when the air conditioner AC is operated is continuously displayed in the status bar 21b shown in FIG. 2. When the determination result in step S15 is negative, the process proceeds to step S17.

In the process of step S17, it is determined whether a request to end the operation of the air conditioner AC (hereinafter also referred to as an "OFF request") has been received from the OP terminal 2. The process of step S17 is repeatedly executed until an affirmative determination result is obtained. When the affirmative determination result is obtained, an instruction to end the operation of the air conditioner AC (hereinafter also referred to as an "OFF instruction") is transmitted to the VH terminal 3 (step S18). In the embodiment, the operation instruction INS_AC including this OFF instruction is transmitted to the VH terminal 3, and the VH terminal 3 ends the operation of the air conditioner AC.

In the routine shown in FIG. 7, first, it is determined whether the air conditioner AC is in operation and the OP terminal 2 is outside the vehicle VH (step S21). Whether the air conditioner AC is in operation is determined based on, for example, the status data STS_AC. Whether the OP terminal 2 is outside the vehicle VH is determined based on, for example, the location data LOC_OT and LOC_VH. When the determination result in step S21 is negative, the process of the routine ends.

When the determination result in step S21 is affirmative, it is determined whether the remaining capacity of the battery that supplies power to the air conditioner AC is equal to or less than a threshold value TH (for example, 20%) (step S22). Whether the remaining capacity of the battery is equal to or less than the threshold value TH is determined based on, for example, the status data STS_BT. When the determination result in step S22 is negative, the process of the routine ends.

When the determination result in step S22 is affirmative, it is determined whether the currently set operation mode of the air conditioner AC is the protection mode (step S23). Whether the currently set operation mode is the protection mode is determined based on, for example, the data of the current operation mode of the air conditioner AC included in the vehicle data VHC. As described above, the operation mode includes the normal mode and the protection mode.

Figure 8:
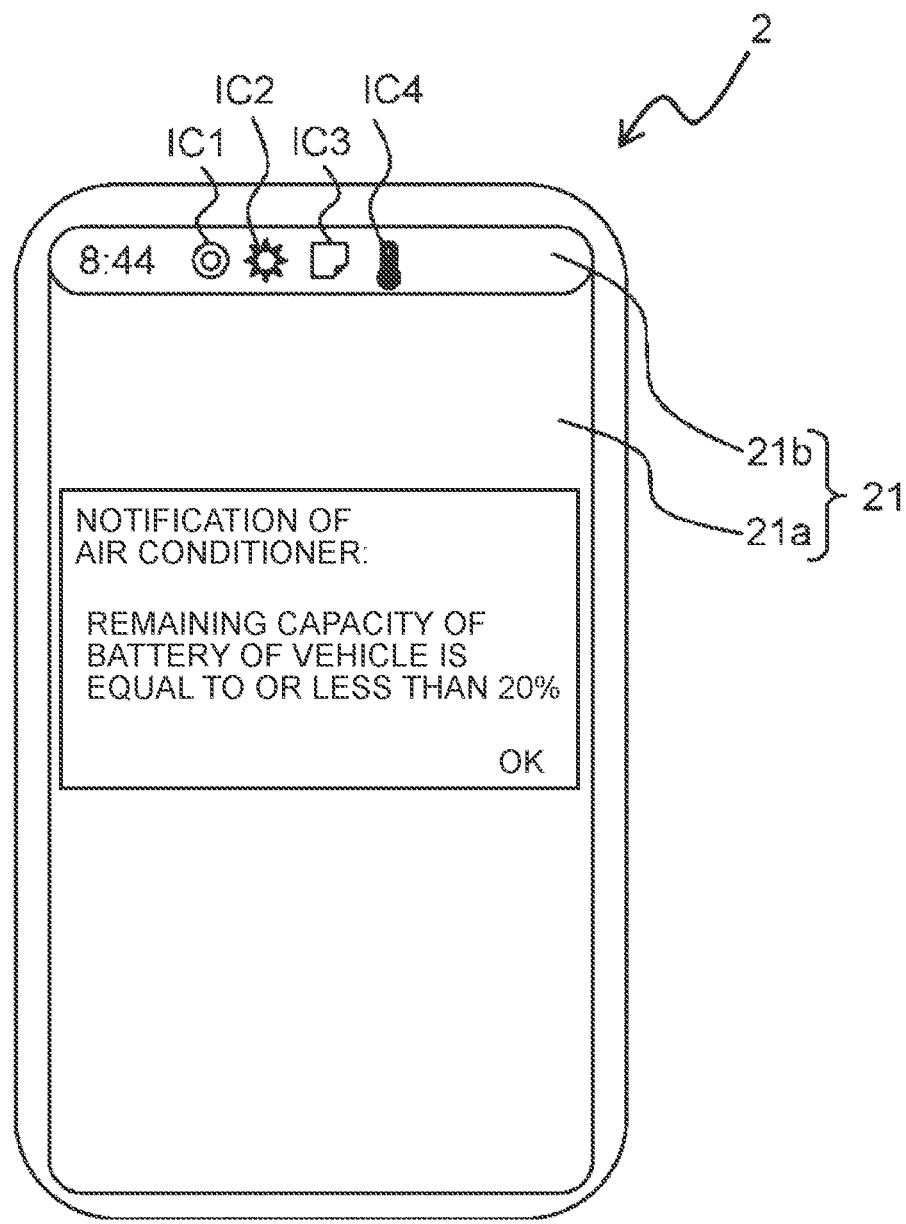
FIG. 8 is a diagram showing an example of a warning displayed on a main screen of the terminal owned by the operator of the vehicle.

When the determination result in step S23 is affirmative, that is, when it is determined that the currently set operation mode is the protection mode, a warning instruction is transmitted to the OP terminal 2 (step S24). In the embodiment, the display control process according to this instruction is performed by the OP terminal 2, so that a warning is displayed on the main screen 21a shown in FIG. 2. FIG. 8 is a diagram showing an example of the warning displayed on the main screen 21a. In the example shown in FIG. 8, a text indicating that the current remaining capacity of the battery is equal to or less than the threshold value TH (for example, 20%) is displayed in the central portion of the main screen 21a. By setting a plurality of the threshold values TH (for example, 20%, 10%, and 5%), the warning can be issued to a threshold value TH closest to the current remaining capacity.

When the determination result in step S23 is negative, that is, when it is determined that the currently set operation mode is the normal mode, the OFF instruction for turning off the operation of the air conditioner AC is transmitted to the VH terminal 3 (step S25). In the embodiment, the operation instruction INS_AC including this OFF instruction is transmitted to the VH terminal 3, and the VH terminal 3 ends the operation of the air conditioner AC.

Following the process of step S25, operation end information of the air conditioner AC (hereinafter also referred to as "OFF information") is transmitted to the OP terminal 2 (step S26). In the embodiment, after the OFF information is transmitted to the OP terminal 2, the content of the message MS indicating execution status data of the program for operating the air conditioner AC is changed to a content corresponding to the OFF information by the display control process of the OP terminal 2.

4. Effect

According to the embodiment described above, when the air conditioner AC of the vehicle VH is operated and the operator OP is outside the vehicle VH, the process is performed in which the icon displayed when the air conditioner AC is operated is continuously displayed in the status bar 21b of the OP terminal 2. This keeps reminding the operator OP outside the vehicle VH that the air conditioner AC is in operation, so that it is possible to suppress the significant decrease in the remaining capacity of the battery that supplies power to the air conditioner AC in advance.

What is claimed is:

1. A method for operating an air conditioner installed in a vehicle, the method comprising:
   a step of operating the air conditioner according to an operation instruction for the air conditioner when the operation instruction is received from a mobile terminal of an operator of the vehicle; and
   a step of displaying a notification related to an operation of the air conditioner on a screen of the mobile terminal while the air conditioner is operated according to the operation instruction, the step being a step in which the notification related to the operation of the air conditioner is continuously displayed on the screen without being deleted by a predetermined operation of the mobile terminal by the operator when the mobile terminal is located outside the vehicle,
   wherein the predetermined operation of the mobile terminal by the operator is an operation for an instruction of deleting of the notification, and
   wherein the step of displaying the notification includes invalidating the instruction of deleting of the notification while the air conditioner is operated according to the operation instruction when the mobile terminal is located outside the vehicle.

2. The method according to claim 1, further comprising:
   a step of determining whether a remaining capacity of a battery that supplies power to the air conditioner is equal to or less than a threshold value; and
   a step of displaying a warning related to the remaining capacity on the screen when determination is made that the remaining capacity is equal to or less than the threshold value and the mobile terminal is located outside the vehicle.

3. The method according to claim 1, wherein:
   the operation instruction includes setting data for an operation mode of the air conditioner;
   the operation mode includes a protection mode for protecting a physical condition of another passenger waiting for return of the operator inside the vehicle while the operator is temporarily away from the vehicle; and
   the method further includes
   a step of determining whether a remaining capacity of a battery that supplies power to the air conditioner is equal to or less than a threshold value,
   a step of determining whether the operation mode is the protection mode when determination is made that the remaining capacity is equal to or less than the threshold value, and
   a step of displaying a warning related to the remaining capacity when determination is made that the operation mode is the protection mode and the mobile terminal is located outside the vehicle, and stopping the operation of the air conditioner when determination is made that the operation mode is not the protection mode and the mobile terminal is located outside the vehicle.

4. The method according to claim 1, wherein the notification related to the operation of the air conditioner is displayed in a status bar on the screen.

5. The method according to claim 1, further comprising:
   determining whether a condition for proposing start of the operation of the air conditioner is satisfied; and
   when the condition for proposing start of the operation of the air conditioner is satisfied, transmitting a proposal to start the operation of the air conditioner to the mobile terminal, the proposal being to be displayed on the terminal.

6. The method according to claim 5, wherein the condition includes that the mobile terminal is outside the vehicle and that the indoor temperature of the vehicle exceeds an upper limit value.

7. The method according to claim 5, wherein the condition includes that the mobile terminal is outside the vehicle and that the indoor temperature is below a lower limit value.

8. The method according to claim 5, wherein the condition includes that the mobile terminal is outside the vehicle and that a difference between the indoor temperature and an outdoor temperature is equal to or greater than a threshold value.

9. The method according to claim 1, wherein the condition includes that the mobile terminal is outside the vehicle and that a scheduled time for the operator to go out is approaching.

10. A system for operating an air conditioner installed in a vehicle, the system comprising:
    a vehicle terminal that controls an operation of the air conditioner; and
    a mobile terminal of an operator of the vehicle that communicates with the vehicle terminal, wherein:
    the vehicle terminal operates the air conditioner according to an operation instruction for the air conditioner when the operation instruction is received from the mobile terminal;
    the mobile terminal displays a notification related to the operation of the air conditioner on a screen of the mobile terminal while the air conditioner is operated according to the operation instruction;
    when the mobile terminal is located outside the vehicle, the notification related to the operation of the air conditioner is continuously displayed on the screen without being deleted by a predetermined operation of the mobile terminal by the operator;
    the predetermined operation of the mobile terminal by the operator is an operation for an instruction of deleting of the notification; and
    the mobile terminal invalidates the instruction of deleting of the notification while the air conditioner is operated according to the operation instruction when the mobile terminal is located outside the vehicle.

* * * * *